Figure 1:
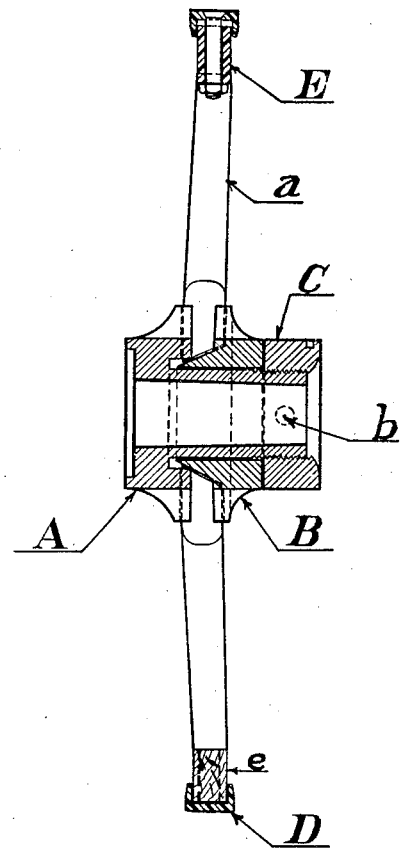

No. 878,440.

PATENTED FEB. 4, 1908.

P. W. WALTZ.
VEHICLE WHEEL.
APPLICATION FILED FEB. 11, 1907.

2 SHEETS—SHEET 1.

WITNESSES:

INVENTOR

No. 878,440.         PATENTED FEB. 4, 1908.
P. W. WALTZ.
VEHICLE WHEEL.
APPLICATION FILED FEB. 11, 1907.
2 SHEETS—SHEET 2.
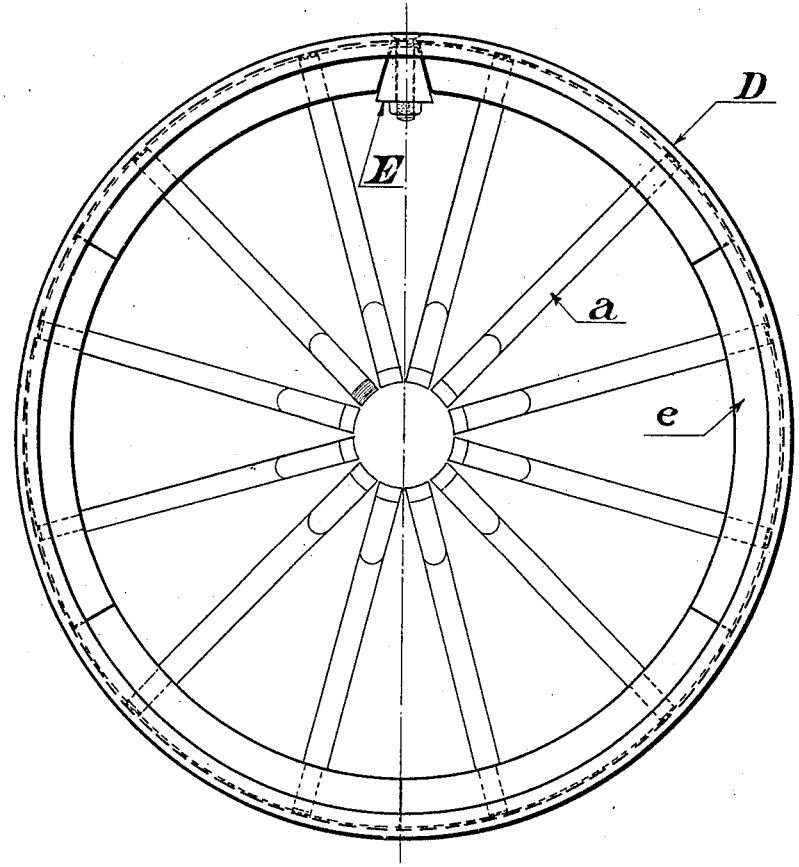
Fig. 2
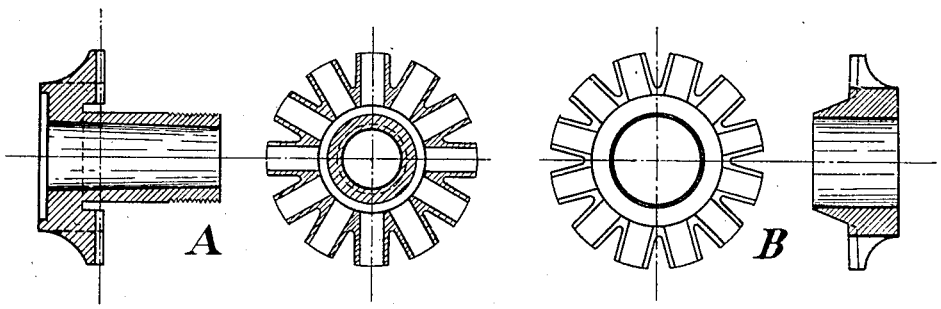
WITNESSES:
John Mills Walsh
Morris Kitelson
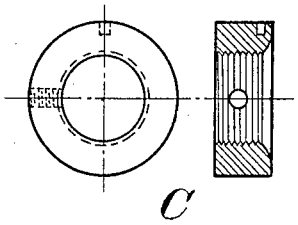
INVENTOR
Philip Will Waltz

UNITED STATES PATENT OFFICE.

PHILIP WILL WALTZ, OF VALLEJO, CALIFORNIA.

VEHICLE-WHEEL.

No. 878,440.  Specification of Letters Patent.  Patented Feb. 4, 1908.

Application filed February 11, 1907. Serial No. 356,914.

*To all whom it may concern:*

Be it known that I, PHILIP WILL WALTZ, a citizen of the United States, residing at Vallejo, county of Solano, and State of California, have invented a new and useful Vehicle-Wheel, of which the following is a specification.

My invention consists in a novel felly and felly expanding device, and a novel hub for vehicle wheels.

It further consists in novel means for securing and forcing outward the inner end of the spokes of vehicle wheels.

The objects of this invention are attained by the construction illustrated in the accompanying drawings, in which Figure 1 is a central vertical cross section of a vehicle wheel. Fig. 2 is a front view of the wheel with the hub removed and the metal parts of the hub shown in both end view and cross section.

Similar reference characters refer to like parts in both figures of the drawings.

The part A of the hub is formed with a cylindrical part, screw threaded at one end for the nut C, and with a spider having sockets for the inner ends of the spokes $a$. A sleeve B has a cone at one end adapted to engage the inner ends of the spokes and a spider formed with sockets to hold the inner ends in place. The inner ends of the spokes are beveled to the bevel of the conical portion of the sleeve B.

The tire D is in the form of a channel and receives the parts $e$ of the felly. A wedge E is mounted on a bolt carried by the tire and can be forced up between adjacent ends of the felly, causing the ends of the parts of the felly to contact firmly. The outer ends of the spokes are secured in holes in the felly in the usual manner. A set screw $b$ is adapted to hold the nut C in position on the part A when the nut has been screwed up.

To assemble the wheel, the parts of the felly with the spokes fitted thereto are placed in the groove of the tire and the wedge E forced up to expand the felly. The part A is then placed so that its sockets will receive the inner ends of the spokes, and the sleeve B slipped over the cylindrical hub, so that the sockets in its spider will also receive the ends of the spokes. The nut C is then screwed on, forcing the cone portion of the sleeve B under the ends of the spokes, thereby forcing them out, the nut being turned by means of a spanner wrench.

The spokes are not reduced in size at the hub but retain their full dimensions and strength. Being gripped by the spiders on parts A and B, they are held rigidly in position thus preventing rattling at this point. The felly expander E prevents any looseness or rattling of the felly or slipping of the tire, and the flanges of the tire protect the edges of the felly. Tire setting is unnecessary and broken spokes can easily be replaced. The wheel may be dished as desired.

Having now explained my improvements, what I claim as my invention and desire to secure by Letters Patent is:—

A vehicle wheel comprising spokes, a felly, a hub having a cylindrical portion threaded at its end and a spider provided with grooves adapted to receive the inner ends of the spokes, a sleeve slidably freely on said hub, provided with a tapering portion adapted to engage the inner ends of the spokes to force them outward and a spider provided with grooves to receive the inner ends of spokes, and a nut adapted to screw onto the hub to force the sleeve inwardly.

PHILIP WILL WALTZ.

Witnesses:
JOHN MILLS WALSH,
MORRIS KETELSON.